United States Patent [19]
Baals et al.

[11] Patent Number: 5,381,461
[45] Date of Patent: Jan. 10, 1995

[54] INTERACTIVE DISPLAY FOR USE IN A TELEPHONE TERMINAL

[75] Inventors: Kimberly A. Baals, Matawan; Kathleen J. Chylinski, Bridgewater; Darren A. Kall, Highland Park; Gary C. Smith, Freehold; Susan L. Tuttle, East Windsor, all of N.J.

[73] Assignee: AT&T Corp., Murray Hill, N.J.

[21] Appl. No.: 47,584

[22] Filed: Apr. 13, 1993

[51] Int. Cl.⁶ .................... H04M 11/00; H04M 1/00
[52] U.S. Cl. ................................. 379/96; 379/93; 379/354; 379/355
[58] Field of Search ............... 379/96, 354, 355, 356, 379/357, 93; 345/168, 169, 172; 341/22, 23; 364/709.14, 709.15

[56] References Cited

U.S. PATENT DOCUMENTS

| | | | |
|---|---|---|---|
| 4,425,627 | 1/1984 | Eibner | 379/96 |
| 4,712,105 | 12/1987 | Kohler | 341/23 |
| 4,788,720 | 11/1988 | Brennan et al. | 379/355 |
| 4,794,639 | 12/1988 | Urui et al. | 379/96 |
| 4,796,008 | 1/1989 | Haneda | 341/23 |

Primary Examiner—Curtis Kuntz
Assistant Examiner—Jason Chan
Attorney, Agent, or Firm—Samuel R. Williamson

[57] ABSTRACT

An arrangement for increasing the available character spaces for softkey label screen prompts in a small interactive display for use in a telephone terminal is provided. In a first configuration of the arrangement, available character spaces in the interactive display are partitioned into equal adjacent character sets with each character set having an allocated number of character spaces for displaying a softkey label. The telephone terminal is configured such that available character spaces in adjacent character sets are borrowed and used by a particular character set having a softkey label for display that exceeds the allocated number of character spaces in the particular character set. In a second configuration of the arrangement, a first character set is combined with an adjacent second character set for displaying the large softkey label. With the more descriptive softkey label screen prompts, a user of the interactive display arrangement is able to move among available menu screen in the interactive display arrangement in an easily understandable manner.

21 Claims, 2 Drawing Sheets

INTERACTIVE DISPLAY FOR USE IN A TELEPHONE TERMINAL

BACKGROUND OF THE INVENTION

1. Technical Field

This invention is directed to interactive display arrangements configured for use in telephone terminals and more particular to an arrangement for enabling a user to recognize and access features available on the telephone terminal.

2. Description of the Prior Art

Telephone terminals that contain user interactive displays and enable a user to access local and network-based features and also to execute local and network-based commands at the telephone terminal are now becoming popular. In these terminals, the number of features or commands available on a display for selection by the user is limited, at any given time, by the finite size of the display.

Most high function telephone terminals provide buttons and indicators for access to network-based features available from a telecommunication switch. Many of these telephone terminals also provide a display which further describes the feature or other available network-based information. Some telephone terminals also provide local features wherein access to a personal directory on a display or a repertory dialer may be provided, for example.

The technology presently in use in telephone displays is character-based liquid crystal device (LCD) displays. These displays are configured in various array sizes such as, for example, 2 line by 24 character LCD and 2 line by 40 character LCD. In order to be aesthetically pleasing when incorporated into the telephone housing, these displays tend to be small, typically on the order of one inch in height. Also, in order to provide a reasonable number of characters for information such as caller information and directory access information, a small font size for the characters is generally used.

Many interactive display arrangements available today permit accessing the features available on the display through softkeys. In order to provide a high level of functionally with a sufficient level of clarity in these displays, many softkey label screen prompts have heretofore been provided for accessing the available features. Often the most unambiguous softkey label for a particular screen prompt is not available for use in the display because the number of characters in the softkey label is incompatible with the limited character space available in the display for such label. This limitation has led to considerable effort being expended in the art for generating sufficiently descriptive truncated labels and at the same time have these labels fit within the allotted character spaces. This limitation has also resulted in some softkey labels being unduly cryptic for the average user of the telephone terminal and thus they tend to be confusing.

Softkey labels in prior art arrangements have had to fit into the number of character spaces generally above one softkey button. By way of example, a 2 line by 24 character display with four softkey buttons allows only four 5 character softkey labels. The remaining 4 character spaces are used for spacing between the softkey labels. In order to increase the number of character spaces for a softkey label, one arrangement available in the art uses the extra 1 character space available in a 2 line by 24 character display for one of the softkey labels thereby being able to use 6 characters rather than 5 characters for one of the softkey labels. Even though some improvement is available with this arrangement, many of the softkey labels are still too cryptic for the average user of the telephone terminal.

Although the softkey label screen prompts in the prior art provide a high level of functionality, they do not do so with the desired level of clarity for the average user of the telephone terminal. It is therefore desirable to provide softkey label screen prompts with a sufficient level of clarity which thereby permit a user of the telephone terminal to easily move about in a hierarchy of menu screens available on the display.

SUMMARY OF THE INVENTION

The prior art problems are solved in accordance with the present invention by providing a user of a telephone terminal with an interactive display arrangement, wherein the number of available character spaces in selected softkey label screen prompts is increased for providing the desired clarity.

In the interactive display of the telephone terminal, available character spaces are partitioned into equal adjacent character sets with each character set being accessible with a softkey button. Each character set includes an allocated number of character spaces for displaying a softkey label. In accordance with an aspect of the invention, the telephone terminal is configured such that available character spaces in adjacent character sets are borrowed and used by a particular character set having a softkey label for display. This borrowing occurs when the characters in the softkey label in the particular character set exceed the allocated number of character spaces in this character set and the softkey labels in the adjacent character sets do not use all of the available character spaces in these character sets.

In accordance with another aspect of the invention, when the softkey label is so large that truncating and borrowing would not provide a label with the sufficient level of clarity for the intended function, a first character set is combined with an adjacent second character set for displaying the large softkey label. To further ensure clarity and ease of use, the functionality of separate softkey buttons, that normally access softkey labels in the first and second character set, is combined. Thus actuating either of these two softkey buttons will access the feature described in the large softkey label.

BRIEF DESCRIPTION OF THE DRAWING

This invention and its mode of operation will be more clearly understood from the following detailed description when read with the appended drawing in which.

DETAILED DESCRIPTION

Figure 1:
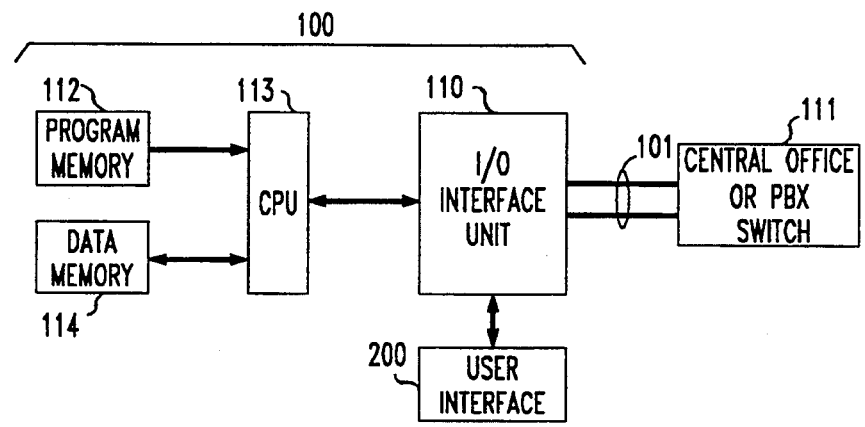
FIG. 1 is a block diagram of a telephone terminal usable for incorporating the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory. 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only- memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
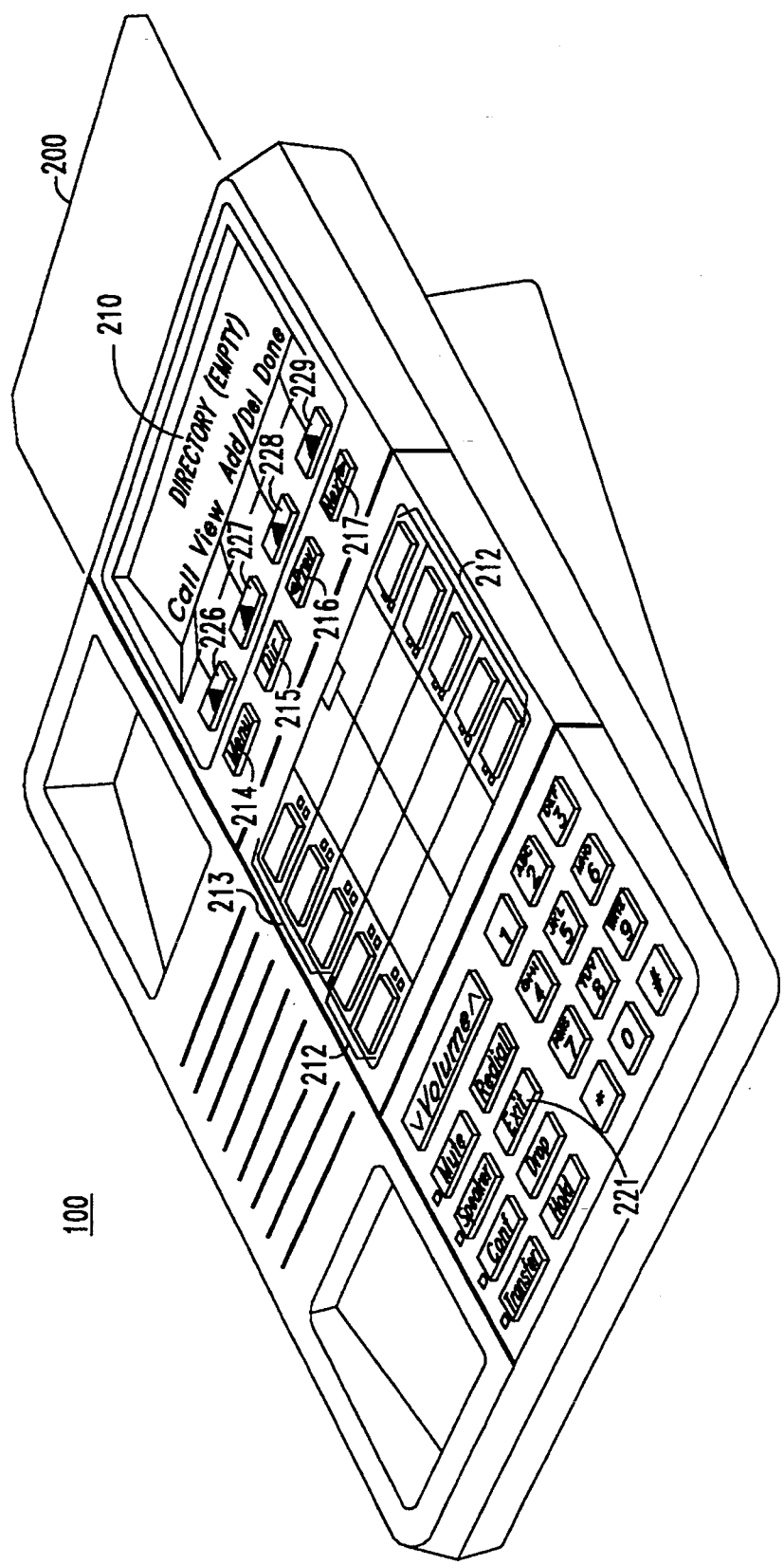
FIG. 2 illustrates the telephone terminal of FIG. 1 including a user interactive display displaying a first menu screen, accessible in accordance with the present invention.

With general reference now to FIG. 2, the user interface 200 comprises a user interactive display 210, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

Figure 3:
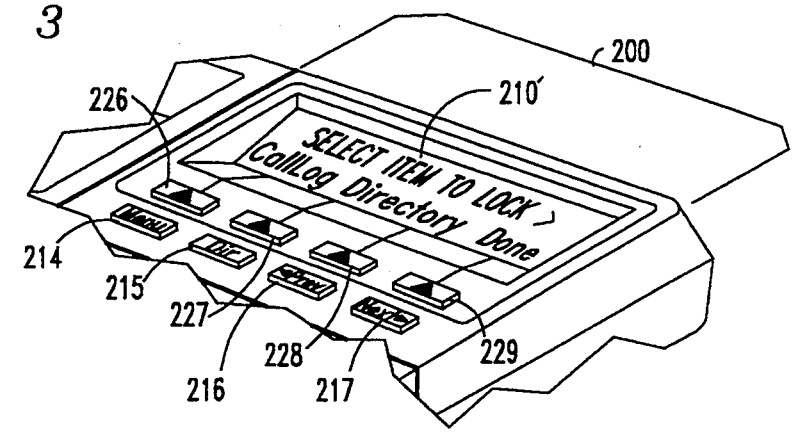
FIG. 3 illustrates the telephone terminal of FIG. 1 including a user interactive display displaying a second menu screen, accessible in accordance with the present invention.
Figure 4:
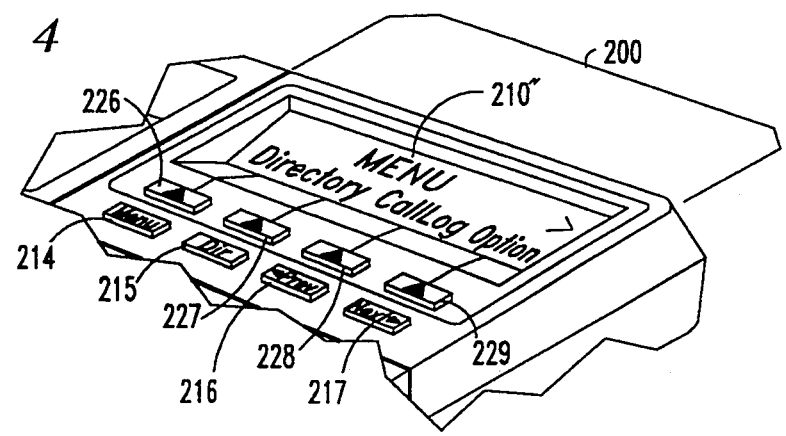
FIG. 4 illustrates the telephone terminal of FIG. 1 including a user interactive display displaying a third menu screen, accessible in accordance with the present invention.

The multiple hard buttons 214 through 217 are respectively labeled "Menu", "Dir", "<Prev", and "Next>". The Menu button 214 is used to configure the terminal to the local softkey state, one aspect of which is illustrated later herein with reference to FIGS. 3 and 4. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229. Also the <Prev and Next> buttons 216 and 217 may be used in the switch feature state, for example, to display the previous or next entry in a directory query feature.

The labels and functions of the softkeys 226 through 229 appear on the associated display 210. The label or function for each of these keys changes dynamically as the user performs functions and makes selections via these softkeys. Shown in the display 210 is just one menu screen in the hierarchically arranged menu. The illustrated entry is that of a personal DIRECTORY which, although illustrated as empty, typically may support up to 30 directory entries. These directory entries may be edited or deleted by depressing the softkey 228. After any desired editing is completed, the terminal is informed of such completion by the user depressing the softkey 229.

While the embodiment of the present invention is described as being incorporated into a telephone terminal, it should be recognized that the present command-operated terminal could be utilized in other program-controlled systems. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid contusion and in order to enable those skilled in the art to practice the claimed invention, this specification will describe the operation of the present invention using the telephone terminal 100 shown in both FIGS. 1 and 2 together with the menu screens 210, 210' and 210" of FIGS. 2, 3 and 4, respectively, which taken together describe the logical steps and the various parameters required to implement the present invention.

The display arrangement improves clarity in interpreting the softkey label screen prompts used in the interactive display 210. This facilitates ease of movement between menu screens in a display device at a telephone terminal. In this regard and with specific reference to the menu screens 210, 210' and 210" of FIGS. 2,3 and 4, respectively, the following operative description, in accordance with the invention, is provided.

Clarity is improved by increasing the number of available character spaces in selected softkey label screen prompts. This clarity is provided in accordance with one illustrated embodiment of the invention wherein available character spaces in the interactive display are partitioned into equal adjacent character sets. With specific reference to FIG. 2, there is shown, for illustration purposes, a 2 line by 24 line character display in the menu screen 210. Each character set includes, for further illustration purposes, five allocated character spaces for displaying a softkey label. The illustrated softkey labels in this menu screen 210 are Call, View, Add/Del and Done. As earlier indicated herein, each softkey label is accessible from its respectively associated softkey button, within the group of buttons 226, 227,228 and 229.

If a large softkey label with increased character spaces over the allocated number of five character spaces is preferable, then spaces are be borrowed from adjacent character sets containing other softkey labels for the particular character set displaying the large softkey label. This borrowing is permitted when the characters in the softkey label in the particular character set exceed the allocated number of character spaces in this character set and the softkey labels in the adjacent character sets do not use all of the available character spaces in these character sets. An example of a softkey label which borrows space is the Add/Del label shown in the display 210 where the adjacently located View and Done labels use only four of the five available spaces.

A borrowing rule, as such, provides general guidelines for sharing character spaces between adjacent character sets. In general, borrowing for a specific character set may be up to two spaces in the illustrated embodiments; one space from an adjacent character set on the left and one space from an adjacent character set on the fight. Using this borrowing rule, it is thus possible to display four softkey labels. The first and second label are configured as X4X6X4X6 or 6X4X6X4X where X is a space and the numbers shown are representing a softkey label with the indicated number of characters. These are the two most preferred label configurations. The third and fourth label configurations are 6X6X4X4X and X4X4X6X X6. Although these configurations 6X6X4X4X and X4X4X6X X6 are realizable, they are less preferable since they do not align properly with the softkey buttons 226 through 229.

If a softkey label requires more than seven character spaces for displaying, then two adjacent character sets in the display are combined and used for that softkey label, in accordance with a second illustrated embodiment of the invention. An illustrative example of the use of two character sets for displaying one softkey label is the label Directory shown in the menu screen 210' of FIG. 3.

To further ensure clarity and ease of use, the functionality of the softkey buttons 227 and 228, that normally access separate softkey labels in their respectively associated character sets, is combined. Thus in the example shown actuating either of these two softkey buttons 227 or 228 will begin the process for locking the Directory as shown in the menu screen 210'.

When two adjacent character sets are combined, if the alignment of any softkey button to the displayed softkey label is ambiguous, the telephone terminal is configured such that the ambiguous softkey button is disabled. Pressing this ambiguous softkey button only provides an error tone to the user. An ambiguous softkey label is illustrated in the menu screen 210' of FIG. 4. In this menu screen, the CallLog softkey label borrows from the adjacent character set to the left and the Option softkey label uses all of its available space. Therefore, the Directory softkey label has too few characters to bridge across the two softkey buttons 226 and 227. Therefore the softkey button 227 is disabled.

With the descriptive softkey label screen prompts described herein, a user of the telephone terminal 100 is able to recognize available features and move easily among menu screens in the interactive display to these features.

What has been described is merely illustrative of the present invention. Other applications to telephone, computer or other user interactive systems other than the disclosed system are contemplated as being within the knowledge of one skilled in the art and may be utilized without departing from the spirit and scope of the present invention.

We claim:

1. An arrangement for displaying information messages in a display device at a telephone terminal, the arrangement comprising;
   means for generating a set of information messages, the information messages varying in size of textual contents;
   means for partitioning character spaces in the display device into adjacent character sets, each character set including an allocated number of character spaces for displaying an information message;
   means for allocating available character spaces from adjacent character sets to a first character set having a specific information message for display when the textual contents of said specific information message exceeds the allocated number of character spaces in said first character set by a first predetermined number, said available character spaces being taken from information messages in said adjacent character sets that use less than the allocated number of character spaces in these character sets; and
   means for accessing a feature associated with the specific information message, said feature being accessed from a softkey button visually aligned on the telephone terminal and associated with said first character set.

2. The arrangement of claim 1 wherein the partitioning means further includes means for providing at least one character space between said adjacent character sets and said first character set having said specific information message for display.

3. The arrangement of claim 2 wherein the information messages generating means generates in the set of information messages one or more specific information messages having textual contents which exceed the allocated number of character spaces.

4. The arrangement of claim 3 wherein the information messages generating means further generates in the set of information messages one or more of the information messages having textual contents which are less than the allocated number of character spaces.

5. The arrangement of claim 4 further including means for displaying in said display device the set of information messages aligned in said adjacent character sets, each information message having an accessible feature associated therewith, said feature being accessed from a softkey button visually aligned with and associated with a character set on the telephone terminal.

6. The arrangement of claim 4 wherein the allocated number of character spaces for displaying an information message is live and said first predetermined number is two.

7. The arrangement of claim 4 further comprising means for combining said first character set with an adjacent second character set for displaying said specific information message, the first and second character sets being combined when the textual contents of said specific information message exceeds the allocated number of character spaces in said first character set by a second predetermined number, said second predetermined number being greater than said first predetermined number; and
   means for accessing associated features in accordance with each information message displayed on the display device, each feature being accessed by actuating an associated one of a plurality of softkey buttons that is visually aligned with one of the character sets on the telephone terminal, the accessing means controlling first and second adjacent softkey buttons on the terminal that are respectively associated with said combined first and second character sets for commonly accessing a feature associated with the specific information message displayed in said combined first and second character sets.

8. An arrangement for displaying information messages in a display device at a telephone terminal, the arrangement comprising;
- means for generating a set of information messages, the information messages varying in size of textual contents;
- means for partitioning character spaces in the display device into adjacent character sets, each character set including an allocated number of character spaces for displaying an information message;
- means for combining a first character set with an adjacent second character set for displaying a specific information message, the first and second character sets being combined when the textual contents of said specific information message exceeds the allocated number of character spaces in said first character set; and
- means for executing associated tasks in accordance with each information message displayed on the display device, each task being executed by actuating one of a plurality of switches on the terminal that is visually aligned and associated with one of the character sets, the executing means controlling first and second adjacent switches on the terminal that are respectively associated with said combined first and second character sets for commonly executing an associated task in accordance with the specific information message displayed in said combined first and second character sets.

9. The arrangement of claim 8 wherein the partitioning means further includes means for deleting character spaces between combined adjacent character sets.

10. The arrangement of claim 9 wherein the partitioning means further includes means for providing at least one character space between adjacent uncombined character sets and said combined first and second character sets.

11. A method of displaying information messages in a display device at a telephone terminal, the method comprising the steps of:
- generating a set of information messages, the information messages varying in size of textual contents;
- partitioning character spaces in the display device into adjacent character sets, each character set including an allocated number of character spaces for displaying an information message;
- allocating available character spaces from adjacent character sets to a first character set having a specific information message for display when the textual contents of said specific information message exceeds the allocated number of character spaces in said first character set by a first predetermined number, said available character spaces being taken from information messages in said adjacent character sets that use less than the allocated number of character spaces in these character sets; and
- accessing a feature associated with the specific information message, said feature being accessed from a softkey button visually aligned on the telephone terminal and associated with said first character set.

12. The method of claim 11 wherein the partitioning step further includes the step of providing at least one character space between said adjacent character sets and said first character set having said specific information message for display.

13. The method of claim 12 wherein the information messages generating step generates in the set of information messages one or more specific information messages having textual contents which exceed the allocated number of character spaces.

14. The method of claim 13 wherein the information messages generating step further generates in the set of information messages one or more of information messages having textual contents which are less than the allocated number of character spaces.

15. The method of claim 14 further including the step of displaying in said display device the set of information messages aligned in said adjacent character sets, each information message having an accessible feature associated therewith, said feature being accessed from a softkey button visually aligned with and associated with a character set on the telephone terminal.

16. The method of claim 14 further comprising the steps of combining said first character set with an adjacent second character set for displaying said specific information message, the first and second character sets being combined when the textual contents of said specific information message exceeds the allocated number of character spaces in said first character set by a second predetermined number, said second predetermined number being greater than said first predetermined number; and
- accessing associated features in accordance with each information message displayed on the display device, each feature being accessed by actuating an associated one of a plurality of softkey buttons that is visually aligned with one of the character sets on the telephone terminal, the accessing step controlling first and second adjacent softkey buttons on the terminal that are respectively associated with said combined first and second character sets for commonly accessing a feature associated with the specific information message displayed in said combined first and second character sets.

17. A method for displaying information messages in a display device at a telephone terminal, the method comprising the steps of:
- generating a set of information messages, the information messages varying in size of textual contents;
- partitioning character spaces in the display device into adjacent character sets, each character set including an allocated number of character spaces for displaying an information message;
- combining a first character set with an adjacent second character set for displaying a specific information message, the first and second character sets being combined when the textual contents of said specific information message exceeds the allocated number of character spaces in said first character set; and
- executing associated tasks in accordance with each information message displayed on the display device, each task being executed by actuating one of a plurality of switches on the terminal that is visually aligned and associated with one of the character sets, the executing step controlling first and second adjacent switches on the terminal that are respectively associated with said combined first and second character sets or commonly executing an associated task in accordance with the specific information message displayed in said combined first and second character sets.

18. The method of claim 17 wherein the partitioning step further includes the step of deleting character spaces between combined adjacent character sets.

19. The method of claim 18 wherein the partitioning step further includes the step of providing at least one character space between adjacent uncombined character sets and said combined first and second character sets.

20. The method of claim 19 wherein the allocated number of character spaces for displaying an information message is five.

21. An arrangement for displaying information messages in a display device at a telephone terminal, the arrangement comprising;

means for generating a set of information messages, the information messages varying in size of textual contents;

means for partitioning character spaces in the display device into adjacent character sets, each character set including an allocated number of character spaces for displaying an information message;

means for allocating to a subject character set character spaces from a first adjacent character set located adjacent to said subject character set when the textual contents of a specific information message for display in said subject character set exceeds the allocated number of character spaces in said subject character set by a first predetermined number;

means for combining said subject character set with said first adjacent character set exceeds the allocated number of character spaces in said subject character set and first adjacent character set being combined when the textual contents of said specific information message exceeds the allocated number of character spaces in said subject character set by a second predetermined number, said second predetermined number being greater than said first predetermined number; and means for accessing a feature associated with the specific information message, said feature being accessed from a first softkey button, visually aligned on the telephone terminal and associated with said subject character set, when the textual contents of the specific information message exceeds the allocated number of character spaces in said subject character set by said first predetermined number, said feature being accessed from said first softkey button and also from a second softkey button, visually aligned on the telephone terminal and associated with said first adjacent character set, when the textual contents of the specific information message exceeds the allocated number of character spaces in said subject character set by said second predetermined number.

* * * * *